(12) United States Patent
Tang et al.

(10) Patent No.: US 10,366,625 B1
(45) Date of Patent: Jul. 30, 2019

(54) KINESTHETIC DEVICE THAT SIMULATES FLIGHT

(71) Applicant: Brogent Technologies Inc., Kaohsiung (TW)

(72) Inventors: Wei-Ching Tang, Kaohsiung (TW); Ke-Cheng Chien, Kaohsiung (TW); Tien-Ni Cheng, Kaohsiung (TW)

(73) Assignee: Brogent Technologies Inc., Qianzhen District, Kaohsiung (TW)

( * ) Notice: Subject to any disclaimer, the term of this patent is extended or adjusted under 35 U.S.C. 154(b) by 0 days.

(21) Appl. No.: 15/873,890

(22) Filed: Jan. 17, 2018

(51) Int. Cl.
| | |
|---|---|
| *A63G 31/16* | (2006.01) |
| *G09B 9/10* | (2006.01) |
| *G09B 9/12* | (2006.01) |
| *G09B 9/16* | (2006.01) |
| *B64D 11/06* | (2006.01) |
| *A63G 9/16* | (2006.01) |
| *A63G 31/00* | (2006.01) |
| *G09B 9/30* | (2006.01) |

(52) U.S. Cl.
CPC ............... *G09B 9/12* (2013.01); *A63G 9/16* (2013.01); *A63G 31/00* (2013.01); *A63G 31/16* (2013.01); *B64D 11/06* (2013.01); *G09B 9/10* (2013.01); *G09B 9/16* (2013.01); *G09B 9/301* (2013.01)

(58) Field of Classification Search
CPC ... A63G 1/00; A63G 1/08; A63G 1/20; A63G 1/38; A63G 9/00; A63G 9/16; A63G 9/18; A63G 31/00; A63G 31/16
USPC .......... 472/119–125, 59–60, 130; 434/29, 55
See application file for complete search history.

(56) References Cited

U.S. PATENT DOCUMENTS

| | | | | | |
|---|---|---|---|---|---|
| 2,497,372 | A | * | 2/1950 | Pricer | A63G 1/20 472/119 |
| 7,824,273 | B2 | * | 11/2010 | Clapper | A47D 9/02 472/119 |
| 8,444,496 | B2 | * | 5/2013 | Lai | A63G 7/00 472/130 |
| 8,721,464 | B2 | * | 5/2014 | Ou Yang | A63G 31/16 434/55 |

* cited by examiner

*Primary Examiner* — Kien T Nguyen
(74) *Attorney, Agent, or Firm* — Chavous Intellectual Property Law LLC

(57) ABSTRACT

A kinesthetic device that simulates flight includes a base unit and a swing unit. The base unit includes a base seat; whereas, the swing unit includes a swing seat, two swing support structures pivoted between the base seat and the swing seat, and a swing actuator used to control the swing positions of the two swing support structures. The two swing support structures are equal in length and parallel to each other. A fixed baseline is formed between two junction points between the two swing support structures and the base seat, a swing baseline is formed between two junction points between the two swing support structures and the swing seat, and the fixed baseline and the swing baseline are equal in length. The two swing support structures, the fixed baseline and the swing baseline form a parallelogram, allowing the swing support structures to swing stably the base seat.

9 Claims, 9 Drawing Sheets

KINESTHETIC DEVICE THAT SIMULATES FLIGHT

FIELD OF THE INVENTION

The present invention relates to a kinesthetic device, and more particularly to a kinesthetic device that simulates flight.

BACKGROUND

In early days, the facilities in an amusement park are primarily used for games in reality. As the advancement in technology, there are amusement facilities of virtual kinesthesia, which are large projection screens with kinesthetic cabins, allowing users to experience the effects in vision, hearing and body feeling.

Referring to FIG. 1, it shows a moving platform in six degrees of freedom disclosed in a Taiwanese Patent Publication No. 546595, including a base platform 11, a moving platform 12 and plural actuators 13. The actuators 13 are disposed between the base platform 11 and the moving platform 12 and work collaboratively to swing the moving platform 12, thereby simulating the real body feeling.

However, the kinesthesia in flight simulated by the movement in six degrees of freedom is still much different than the kinesthesia in real flight, and the present motion platform of simulation is still not real enough, as the kinesthesia of ascending and descending steadily while taking a plane cannot be simulated. In addition, as the conventional moving platform should use at least six sets of actuators, the difficulty in control is raised and the manufacture cost is increased too.

It is worthy of mentioning that although the kinesthetic facility in six degrees of freedom can provide basic motion simulations, as plural extendable rods are disposed alternately between the platforms, the action of one extendable rod will affect other extendable rods. Furthermore, for the kinesthetic facility in six degrees of freedom to accurately simulate the kinesthesia in taking a plane, the plural extendable rods should be extended or compressed significantly, which will increase the use size and the setup size of the parts, thereby further increasing the cost and difficulty in setup.

Accordingly, it is an object to be achieved to by related professionals to achieve a kinesthetic facility with fewer actuating parts, thereby reducing the cost as well as simulating the kinesthesia in flight effectively and precisely.

SUMMARY OF THE INVENTION

Accordingly, the primary object of the present invention is to provide a kinesthetic device that simulates flight, comprising a base unit and a swing unit.

The base unit includes a base seat.

The swing unit includes a swing seat, at least two swing support structures pivoted between the base seat and the swing seat, and a swing actuator used to control the swing positions of the two swing support structures.

The two swing support structures are equal in length and are parallel to each other. A fixed baseline is formed between two junction points between the swing support structures and the base seat, and a swing baseline is formed between two junction points between the swing support structures and the swing seat; whereas, the fixed baseline and the swing baseline are equal in length. The swing support structures, the fixed baseline and the swing baseline form a parallelogram.

The benefits of the present invention lie in that by a kinesthetic controller to control the swing actuator and a flip actuator respectively, the swing actuator controls the swing angle of a riding seat, and the flip actuator controls the flipping angle of the riding seat, so that a user who sits in the riding seat can experience the kinesthesia in steady ascension.

For the examiners to clearly understand the technical features and the content of the present invention, the present invention is hereinafter described in details with the accompanying drawings and the expression in the form of two preferred embodiments. In addition, prior to the detailed description, it should be noted that same or similar reference numerals are used to designate the same or similar elements

DETAILED DESCRIPTION OF THE PREFERRED EMBODIMENTS

Figure 1:
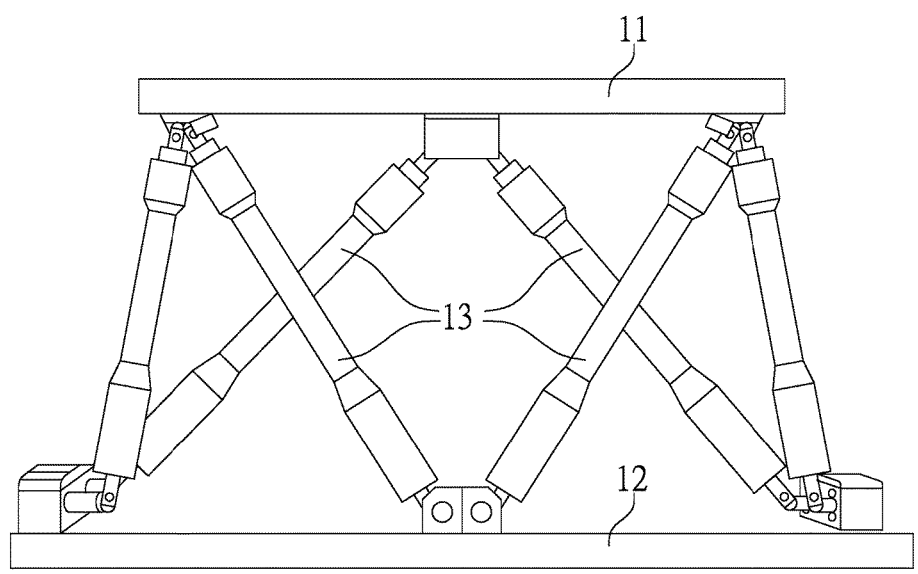
FIG. 1 shows a schematic view, illustrating a moving platform in six degrees of freedom disclosed in a Taiwanese Patent Publication No. 546595.
Figure 2:
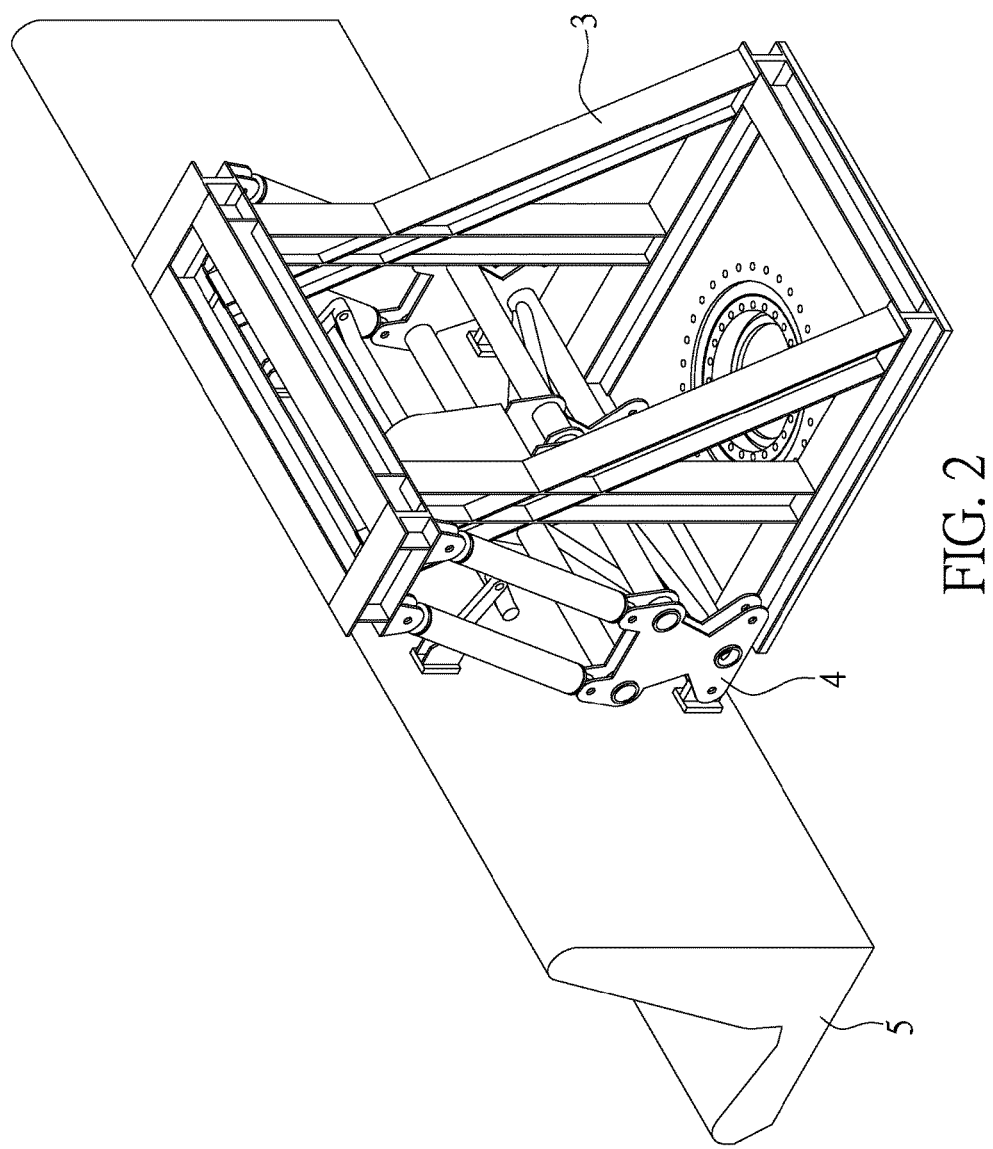
FIG. 2 shows a schematic view, illustrating a three-dimensional configuration of a first preferred embodiment of a kinesthetic device that simulates flight, according to the present invention.
Figure 3:
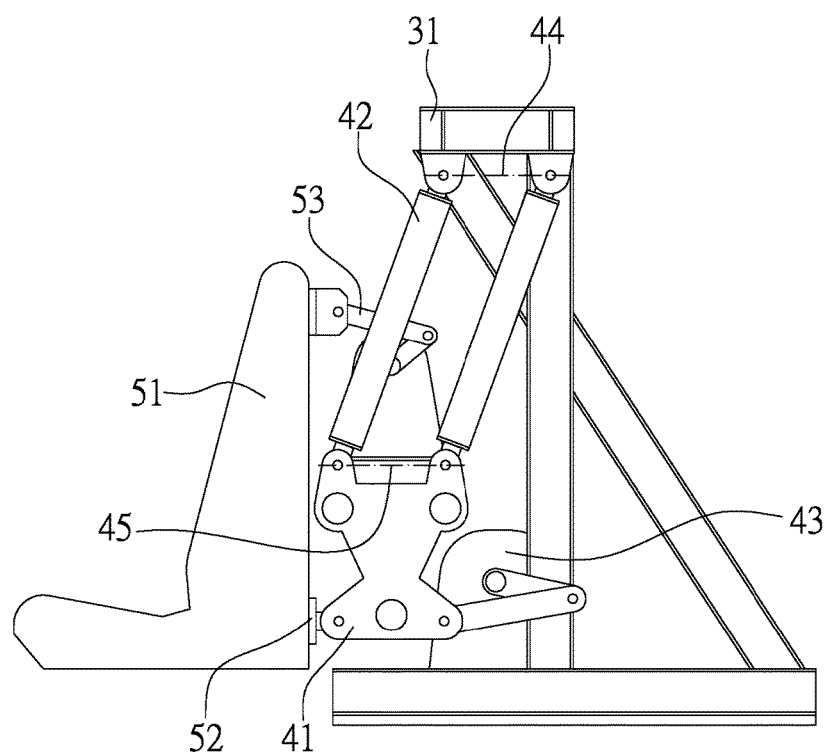
FIG. 3 shows a schematic view, illustrating a configuration of the lowest point of swing, according to the first preferred embodiment of the present invention.
Figure 4:
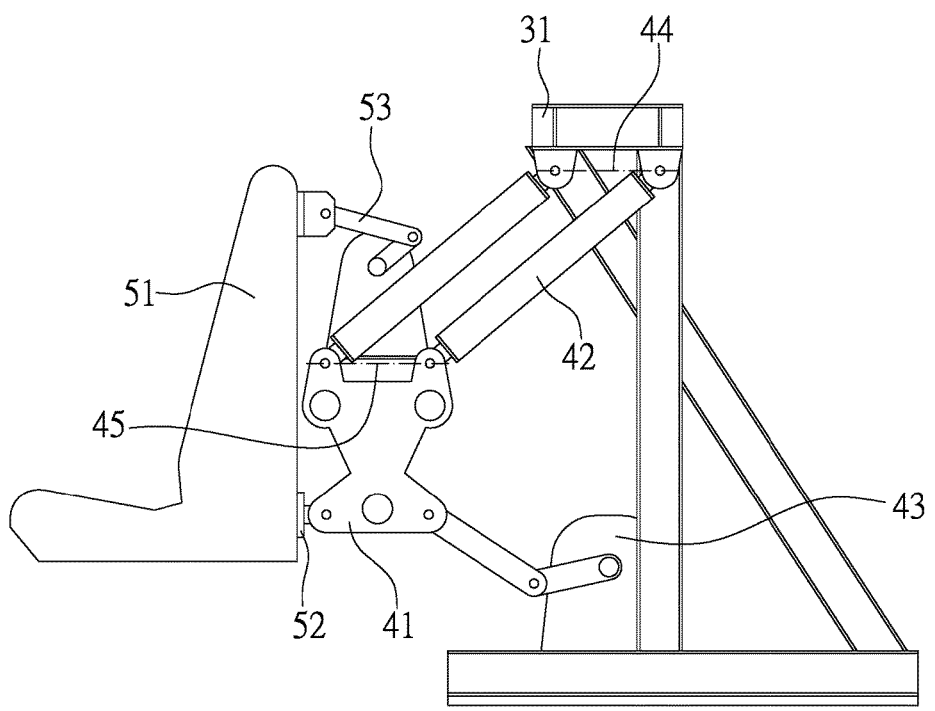
FIG. 4 shows a schematic view, illustrating a configuration of the highest point of swing, according to the first preferred embodiment of the present invention.

Referring to FIGS. 2 to 4, it shows a first preferred embodiment of a kinesthetic device that simulates flight, according to the present invention. The first preferred embodiment comprises a base unit 3, a swing unit 4, a flip unit 5 and a control unit (not shown on the drawings).

The base unit 3 includes a base seat 31. In the first preferred embodiment, the base seat 31 is disposed on ground and is put up on the ground for the provision of the swing unit 4, so that the swing unit 4 can swing relative to the base seat 31. In a practical implementation, the base seat 31 can, not limited to, be hung up on a top of building, be combined with a rotational device to rotate or be disposed on a carrier for transportation.

The swing unit 4 includes a swing seat 41, at least two swing support structures 42 pivoted between the base seat 31 and the swing seat 41, and a swing actuator 43 used to control the swing positions of the swing support structures 42.

As the body of the base seat 31 is located high, the pivot points between the swing support structures 42 and the base seat 31 are higher, so that the two swing support structures 42 can swing relatively to the base seat 31.

The two swing support structures 42 are equal in length and are parallel to each other. A fixed baseline 44 is formed between two junction points between the two swing support structures 42 and the base seat 31, and a swing baseline 45 is formed between two junction points between the two swing support structures 42 and the swing seat 41. The fixed baseline 44 and the swing baseline 45 are equal in length and are parallel to each other, allowing the two swing support structures 42, the fixed baseline 44 and the swing baseline 45 to form a parallelogram.

In the first preferred embodiment, there are two sets of swing support structures 42 to stabilize the flip unit 5, wherein the length of each swing support structure 42 should be identical to maintain a parallelogram for the two swing support structures 42, the fixed baseline 44 and the swing baseline 45 when being seen along a side. In a practical implementation, the quantity of the swing support structures 42 should not be limited to that in the example in the present embodiment.

The fixed baseline 44 serves as the pivot point for the two swing support structures 42 and the base seat 31. As the base seat 31 is fixed, the fixed baseline 44 is also fixed. On the other hand, the swing baseline 45 acts as the pivot point for the two swing support structures 42 and the swing seat 41. The two swing support structures 42 swing relatively to the base seat 31, and therefore, the swing baseline 45 will swing along with the two swing support structures 42, and the base seat 31 will move along with the swing baseline 45.

It is worthy of mentioning that the two swing support structures 42 are equal in length, and the fixed baseline 44 and the swing baseline 45 are equal in length. Therefore, even that the swing baseline 45 swings along with the two swing support structures 42, the shape formed by the two swing support structures 42, the fixed baseline 44 and the swing baseline 45 is still a parallelogram.

For a parallelogram, two sets of the opposite sides are parallel and equal in length. In addition, two sets of the opposite angles are also equal in size. In the present preferred embodiment, the angles of the parallelogram formed by the two swing support structures 42, the fixed baseline 44 and the swing baseline 45 will be changed due to the swing of the two swing support structures 42, but the shape will still be a parallelogram.

The fixed baseline 44 is higher than the swing baseline 45, and the swing baseline 45 moves parallelly and swings stably. Therefore, the swing seat 41 will swing parallelly and stably along with the swing baseline 45. On the other hand, the flip unit 5 disposed at the swing seat 41 also swings parallelly and stably. When the swing actuator 43 stably controls the position of the swing seat 41, the kinesthetic effect in ascension or descending of taking a plane can be simulated effectively. If it is only to simply provide the kinesthetic effect in simulating the ascension or descending of taking a plane, then chairs can be disposed on the swing seat 41 without providing the flip unit 5.

The flip unit 5 includes a riding seat 51, a flip support structure 52 disposed between the swing seat 41 and the riding seat 51, and a flip actuator 53 used to control the flipping angle of the riding seat 51. The flip support structure 52 is a kind of bearing, allowing the riding seat 51 to rotate relative to the swing seat 41 and disposing the riding seat 51 on the swing seat 41. The flip actuator 53 can control the rotation angle of the riding seat 51 with respect to the swing seat 41.

In the first preferred embodiment, the riding seat 51 can be a chair which has a seating capacity of plural users, and is pivoted on the swing seat 41 with two flip support structures 52. The flip actuator 53 can control the forward falling angle or the backward lifting angle of the riding seat 51. In a practical implementation, the riding seat 51 can be, not limited to, a single-user chair.

Figure 5:
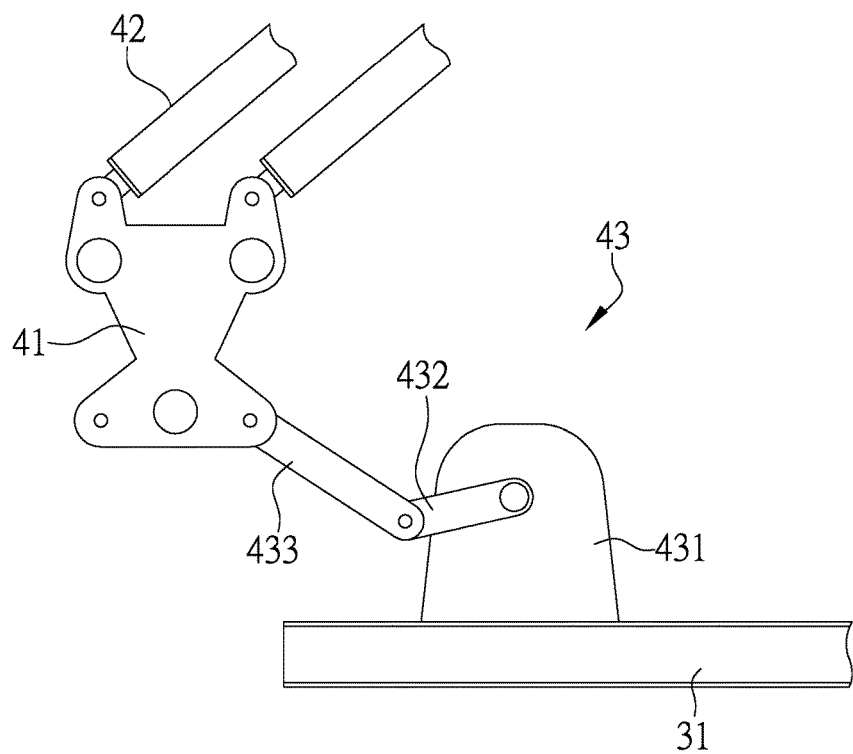
FIG. 5 shows a schematic view, illustrating a swing actuator of the first preferred embodiment of the present invention.

Referring to FIG. 5, the swing actuator 43 of the first preferred embodiment is provided with a swing motor 431 disposed at the base seat 31, a swing rotation rod 432 connected with the swing motor 431, and a swing push-and-pull rod 433 connected with the swing rotation rod 432 and the swing seat 41. The swing motor 431 controls the rotation angle to control the position of the swing seat 41.

The two swing support structures 42 limit the moving track of the swing seat 41, the swing actuator 43 utilizes the swing motor 431 to rotate the swing rotation rod 432, and drives the swing push-and-pull rod 433 to push the swing seat 41; therefore, the swing actuator 43 can accurately control the position of the swing seat 41 in the moving track.

Figure 6:
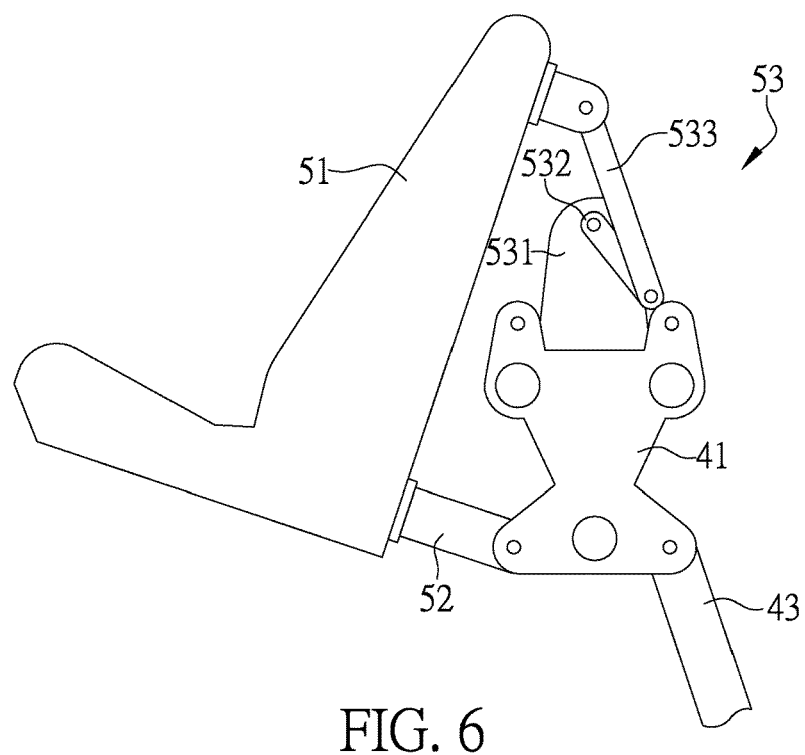
FIG. 6 shows a schematic view, illustrating a configuration of backward flip of a riding seat, according to the first preferred embodiment of the present invention.
Figure 7:
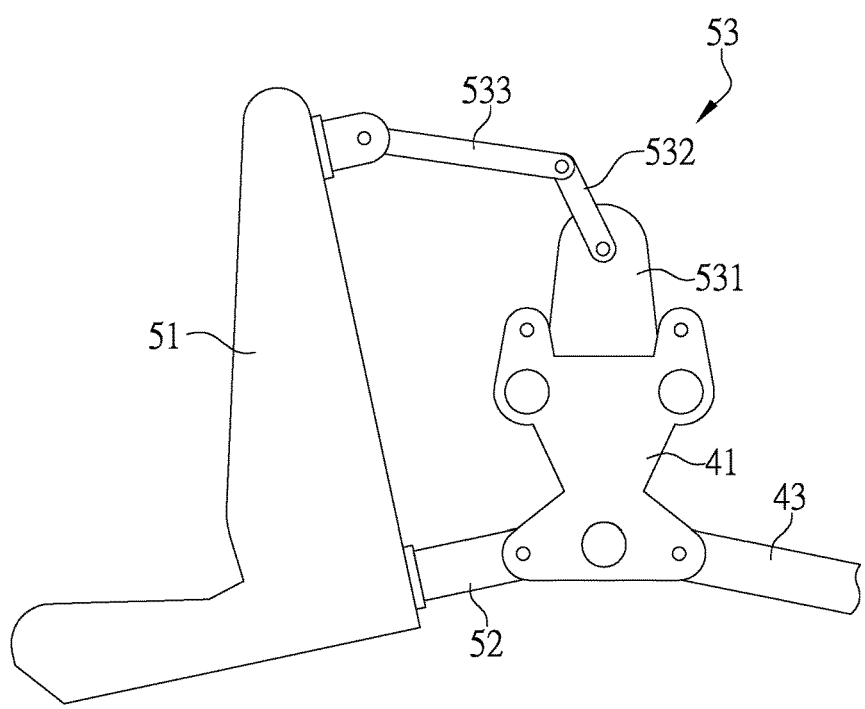
FIG. 7 shows a schematic view, illustrating a configuration of forward falling of the riding seat, according to the first preferred embodiment of the present invention.

Referring to FIG. 6 and FIG. 7, the flip actuator 53 of the first preferred embodiment is provided with a flip motor 531 disposed at the swing seat 41, a flip rotation rod 532 connected with the flip motor 531, and a flip push-and-pull rod 533 connected with the flip rotation rod 532 and the riding seat 51. The flip motor 531 controls the rotation angle to control the rotation angle of the riding seat 51.

The flip support structures 52 are fixed between the riding seat 51 and the swing seat 41, allowing the riding seat 51 to rotate relatively to the swing seat 41. The flip actuator 53 utilizes the flip motor 531 to rotate the flip rotation rod 532, and drives the flip push-and-pull rod 533 to push the riding seat 51. Therefore, the flip actuator 53 can accurately control the rotation angle of the riding seat 51.

The abovementioned control technology that the swing actuator 43 and flip actuator 53 utilize the motors to move the position or rotate the angle is only a preferred example in the first preferred embodiment. In a practical implementation, the position of the riding seat 51 can be controlled by an actuator, such as, but not limited to, a steam cylinder, an oil cylinder or a screw.

Figure 8:
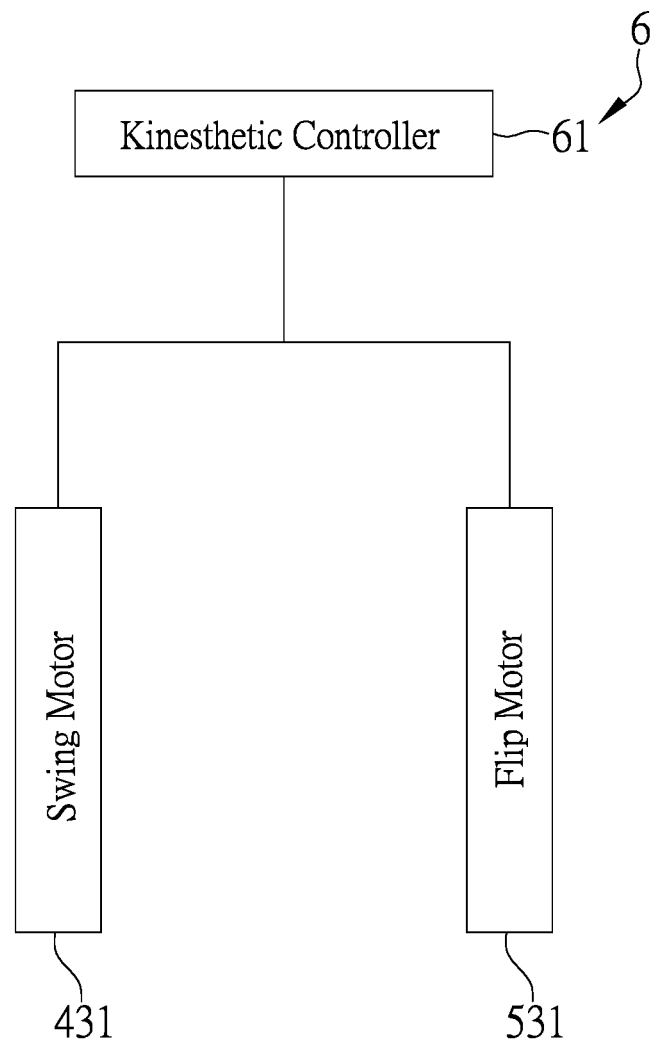
FIG. 8 shows a block diagram, illustrating a control unit of the first preferred embodiment of the present invention.

In collaboration with FIG. 8, the control unit 6 includes a kinesthetic controller 61. The kinesthetic controller 61 is connected electrically with the swing motor 431 and the flip motor 531. Preferably, the kinesthetic controller 61 is connected with a video-audio output device to provide users sitting in the riding seat (not shown on the drawing) with images and sound. Furthermore, in association with a kinesthetic device that simulates flight, according to the present invention, the users who sit in the riding seat can actually experience the kinesthesia in flight. As the technological means used in combining images and sound with the kinesthetic device has already been known by the related industry and widely applied to the kinesthetic facilities, no further description is provided.

The swing unit (not shown on the drawing) provides the parallel and stable swing action, the flip unit (not shown on the drawing) provides the actions of forward falling and backward lifting, and the kinesthetic controller 61 accurately controls the rotation angles of the swing motor 431 and the flip motor 531, so as to provide the kinesthesia in sitting in the riding seat to fly.

It is to be emphasized by the present inventor that the early kinesthetic technology using a six-axis cylinder must take up a huge setup space and the kinesthetic facilities can be only disposed on ground. Although a complex control technology is used in the mutual interference among plural actuating cylinders, it is still unable to provide a stable swing to fully simulate the kinesthesia in flight. However, the kinesthesia in flight can be manifested by only using the kinesthetic controller 61 of the present invention to control the swing motor 431 and the flip motor 531. In addition, the setup space can be saved, the complexity in control can be reduced, and the manufacture cost of the kinesthetic device can be decreased.

Figure 9:
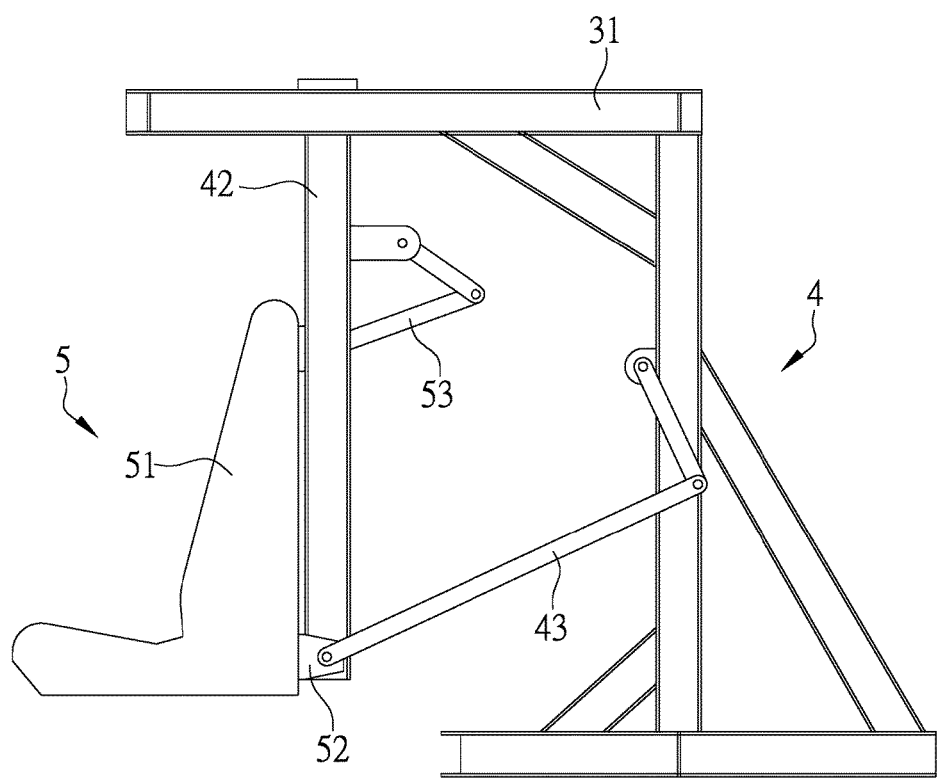
FIG. 9 shows a schematic view, illustrating a second preferred embodiment of the kinesthetic device that simulates flight, according to the present invention.
Figure 10:
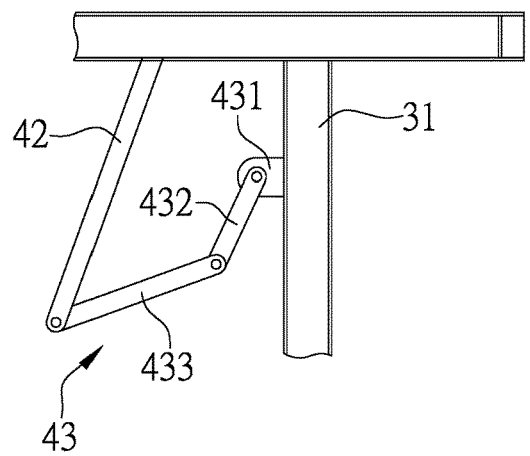
FIG. 10 shows a schematic view, illustrating a swing actuator of the second preferred embodiment of the present invention.
Figure 11:
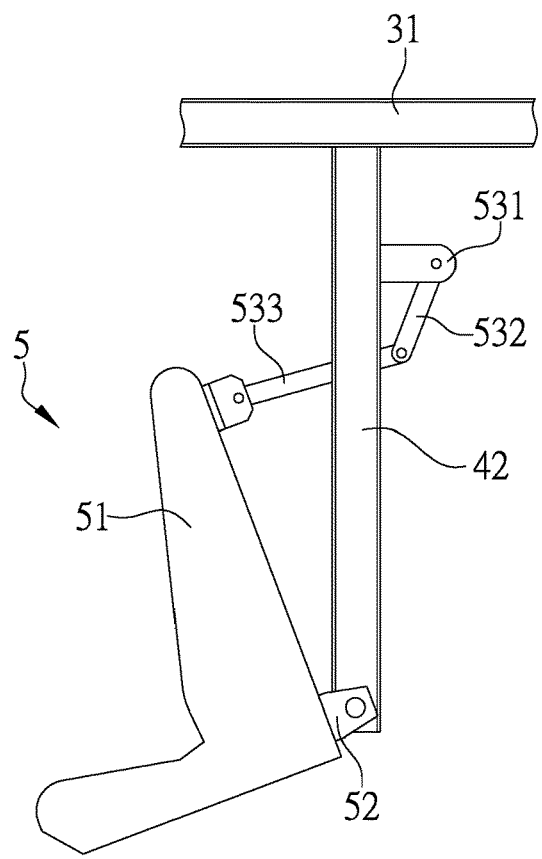
FIG. 11 shows a schematic view, illustrating a flip actuator of the second preferred embodiment of the present invention.

Referring to FIGS. 9 to 11, it shows a second preferred embodiment of the kinesthetic device that simulates flight, according to the present invention. The second preferred embodiment is generally the same as the first preferred embodiment, and therefore the similarities will not be described in detail hereinafter. The difference between the two preferred embodiments lies in that the swing unit 4 of the second preferred embodiment includes a swing support structure 42 pivoted at the base seat 31, and a swing actuator 43 used to control the swing angle of the swing support structure 42.

The flip unit 5 includes a riding seat 51 pivoted at the swing support structure 42, a flip support structure 52 disposed between the swing support structure 42 and the riding seat 51, and a flip actuator 53 used to control the flipping angle of the riding seat 51.

The swing actuator 43 of the second preferred embodiment is provided with a swing motor 431 disposed at the base seat 31, a swing rotation rod 432 disposed at the swing motor 431, and a swing push-and-pull rod 433 disposed between the swing rotation rod 432 and the swing support structure 42.

The flip actuator 53 of the second preferred embodiment is provided with a flip motor 531 disposed at the swing support structure 42, a flip rotation rod 532 disposed at the flip motor 531, and a flip push-and-pull rod 533 disposed between the flip rotation rod 532 and the riding seat 51.

The kinesthetic controller (not shown on the drawing) controls respectively the operation of the swing motor 431 and the flip motor 531. Due to the fact that when the swing actuator 43 of the second preferred embodiment controls the angle of the swing support structure 42, the forward falling angle or the backward lifting angle of the riding seat 51 will be changed too, while the kinesthetic controller controls the flip motor 531, the rotation angle of the swing motor 431 must be taken into consideration; and it is because the motor control instructions are simpler and can be fitted easily to acquire better control parameters.

From the abovementioned descriptions, it is known that the kinesthetic device that simulates flight, according to the present invention, is indeed provided with following benefits:

1. Simplicity in Control

Unlike the early kinesthetic technology using a six-axis cylinder, the present invention only needs a set of swing unit 4 to perfectly manifest the kinesthesia in flight for the riding seat 51. In addition, with a set of flip unit 5, the kinesthesia in forward falling or backward lifting for the riding seat 51 can be enhanced. Furthermore, the kinesthetic controller 61 can use simple instructions to operate the swing motor 431 and the flip motor 531.

2. Flight Simulation

The fixed baseline 44 is higher than the swing baseline 45, and the swing baseline 45 moves parallelly and swings stably. Therefore, the swing seat 41 will swing parallelly and stably along with the swing baseline 45, and the flip unit 5 disposed at the swing seat 41 will also swing parallelly and stably, thereby effectively simulating the kinesthetic effect in ascension or descending of taking a plane.

3. Cost Saving

The swing unit 4 of the present invention provides the stable actions of ascension and descending, and the flip unit 5 provides the actions of forward falling or backward lifting. Therefore, the structures are simple without taking up a space and can be maintained and repaired easily, which saves the operation cost effectively.

Accordingly, the fixed baseline 44 is higher than the swing baseline 45, and the swing baseline 45 moves parallelly and swings stably. Therefore, the swing seat 41 will swing parallelly and stably along with the swing baseline 45, and the flip unit 5 disposed at the swing seat 41 will also swing parallel and stably, thereby effectively simulating the kinesthetic effect in ascension or descending of taking a plane.

In addition, the swing unit 4 is responsible for the simulation of the kinesthesia in ascension and descending of flight, the flip unit 5 is responsible for the simulation of the kinesthesia in forward falling or backward lifting of flight, and the kinesthetic controller 61 controls respectively the swing unit 4 and the flip unit 5, so that the swing unit 4 and the flip unit 5 can operate collaboratively, allowing the users who sit in the riding seat 51 to experience the feeling of actual flight. Therefore, the object of the present invention can be achieved actually.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A kinesthetic device that simulates flight, comprising a base unit which includes a base seat; and
   a swing unit which includes a swing seat, two swing support structures pivoted between the base seat and the swing seat, and a swing actuator used to control the swing positions of the two swing support structures;
   with that the two swing support structures are equal in length and parallel to each other, a fixed baseline is formed between two junction points between the two swing support structures and the base seat, a swing baseline is formed between two junction points between the two swing support structures and the swing seat, the fixed baseline and the swing baseline are equal in length, and the swing support structures, the fixed baseline and the swing baseline form a parallelogram, and
   a flip unit which includes a riding seat, a flip support structure disposed between the swing seat and the riding seat, and a flip actuator used to control the flipping angle of the riding seat.

2. The kinesthetic device that simulates flight, according to claim 1, wherein the swing actuator is provided with a swing motor disposed at the base seat, a swing rotation rod connected with the swing motor, and a swing push-and-pull rod connected with the swing rotation rod and the swing seat, with that the swing motor controls the rotation angle to control the position of the swing seat.

3. The kinesthetic device that simulates flight, according to claim 2, wherein the flip actuator is provided with a flip motor disposed at the swing seat, a flip rotation rod connected with the flip motor, and a flip push-and-pull rod connected with the flip rotation rod and the riding seat, with that the flip motor controls the rotation angle to control the rotation angle of the riding seat.

4. The kinesthetic device that simulates flight, according to claim 3, wherein the fixed baseline is higher than the swing baseline.

5. The kinesthetic device that simulates flight, according to claim 4, further comprising a control unit which includes a kinesthetic controller, with that the kinesthetic controller is connected electrically with the swing motor and the flip motor.

6. A kinesthetic device that simulates flight, comprising a base unit which includes a base seat;
a swing unit which includes a swing support structure pivoted at the base seat and a swing actuator used to control the swing angle of the swing support structure; and
a flip unit which includes a riding seat pivoted at the swing support structure, a flip support structure disposed between the swing support structure and the riding seat, and a flip actuator used to control the flipping angle of the riding seat.

7. The kinesthetic device that simulates flight, according to claim 6, wherein the swing actuator is provided with a swing motor disposed at the base seat, a swing rotation rod disposed at the swing motor, and a swing push-and-pull rod disposed between the swing rotation rod and the swing support structure.

8. The kinesthetic device that simulates flight, according to claim 7, wherein the flip actuator is provided with a flip motor disposed at the swing support structure, a flip rotation rod disposed at the flip motor, and a flip push-and-pull rod disposed between the flip rotation rod and the riding seat.

9. The kinesthetic device that simulates flight, according to claim 8, further comprising a control unit which includes a kinesthetic controller, with that the kinesthetic controller is connected electrically with the swing motor and the flip motor.

* * * * *